May 23, 1967 M. C. TOURTELLOTTE 3,320,674
SIGHT GAGE FOR A VERTICAL POLE
Filed Sept. 7, 1965 7 Sheets-Sheet 1
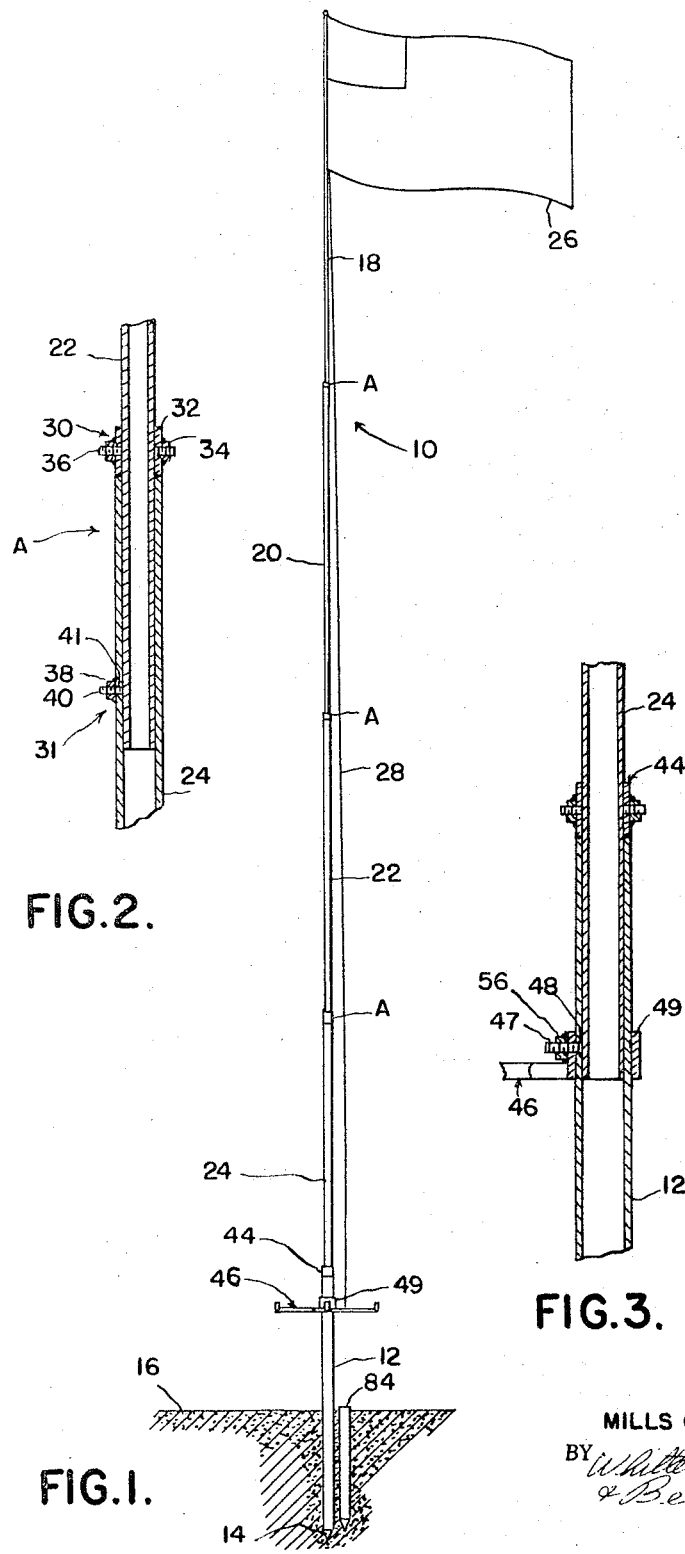
INVENTOR.
MILLS C. TOURTELLOTTE
BY Whittemore, Hulbert
& Belknap
ATTORNEYS

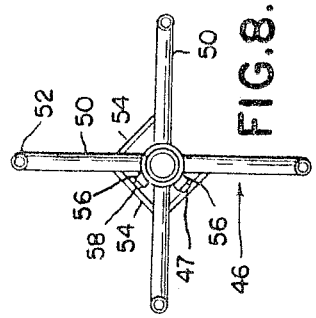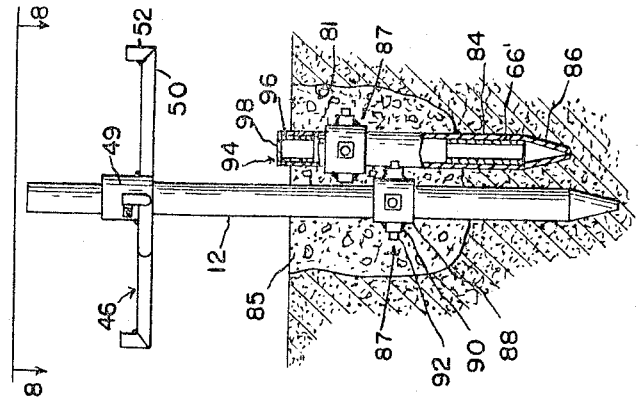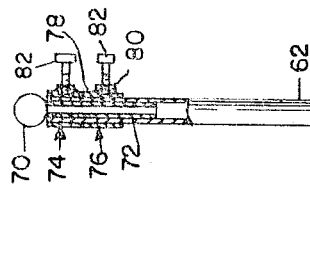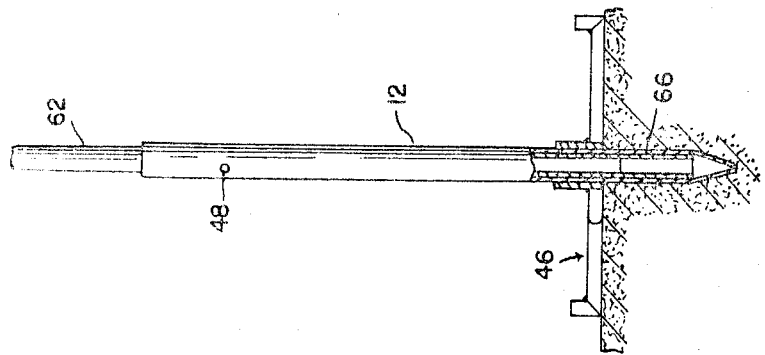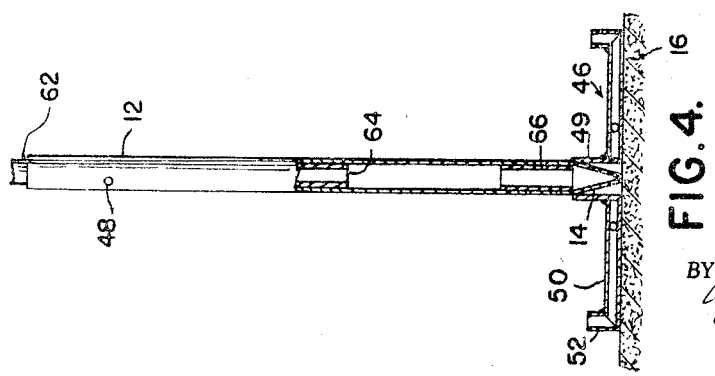

May 23, 1967 M. C. TOURTELLOTTE 3,320,674
SIGHT GAGE FOR A VERTICAL POLE
Filed Sept. 7, 1965 7 Sheets-Sheet 3

INVENTOR.
MILLS C. TOURTELLOTTE
BY Whittemore, Hulbert
& Belknap
ATTORNEYS

May 23, 1967  M. C. TOURTELLOTTE  3,320,674
SIGHT GAGE FOR A VERTICAL POLE
Filed Sept. 7, 1965  7 Sheets-Sheet 4
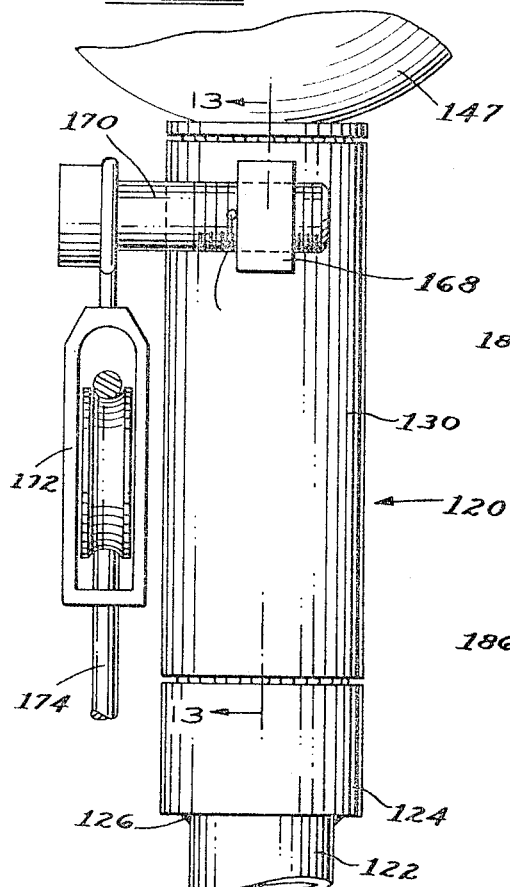
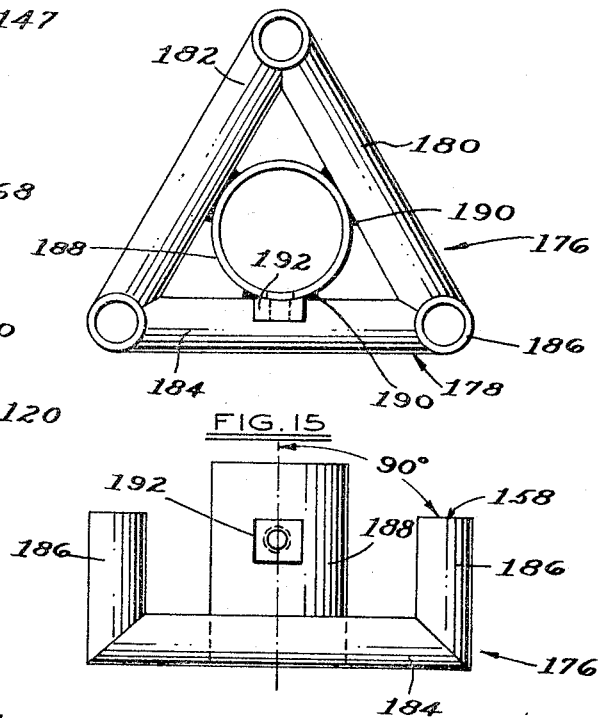
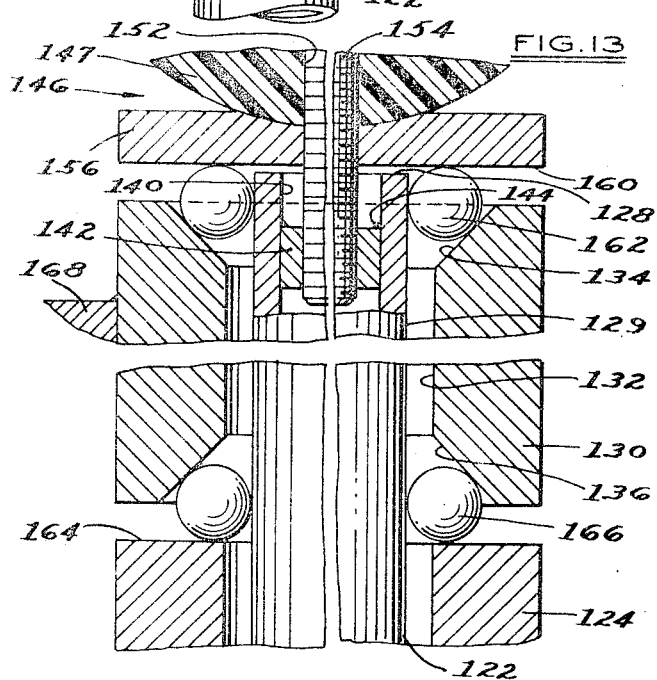
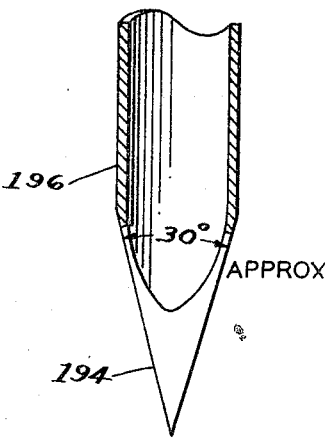
INVENTOR.
MILLS C. TOURTELLOTTE
BY
Whittemore, Hulbert
& Belknap
ATTORNEYS INVENTOR.
MILLS C. TOURTELLOTTE
BY Whittemore Hulbert
& Belknap
ATTORNEYS May 23, 1967   M. C. TOURTELLOTTE   3,320,674
SIGHT GAGE FOR A VERTICAL POLE
Filed Sept. 7, 1965
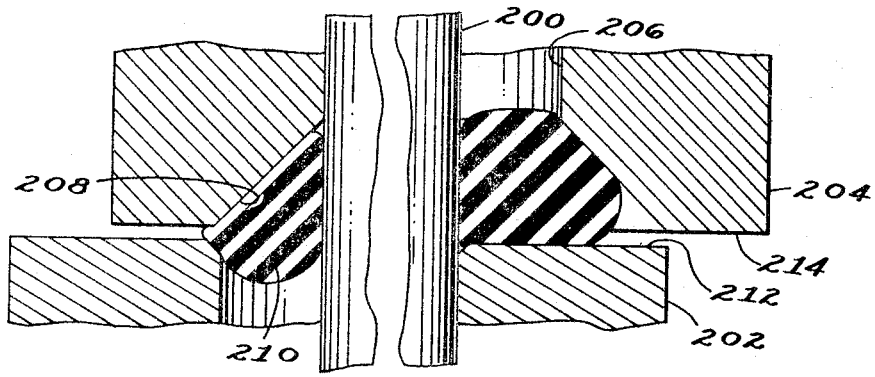
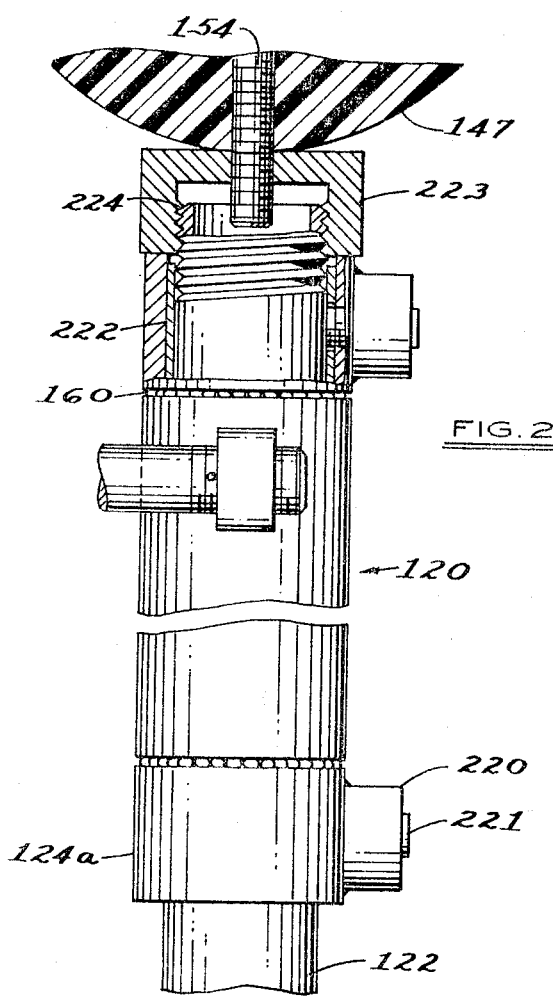
INVENTOR.
MILLS C. TOURTELLOTTE
BY
ATTORNEYS

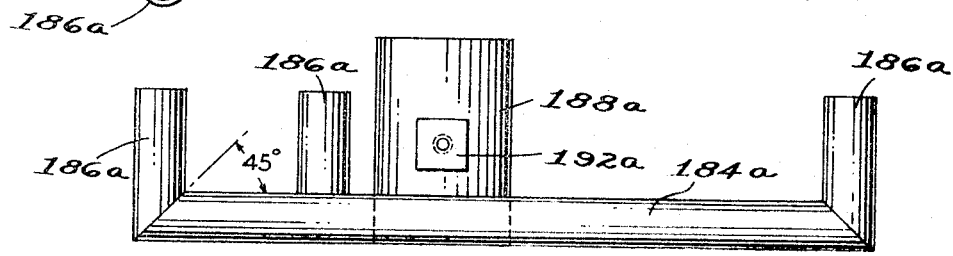

United States Patent Office 3,320,674
Patented May 23, 1967

3,320,674
SIGHT GAGE FOR A VERTICAL POLE
Mills C. Tourtellotte, 1114 Inwood Drive,
Richmond, Tex. 77469
Filed Sept. 7, 1965, Ser. No. 485,170
7 Claims. (Cl. 33—209)

This application is a continuation-in-part application of my copending application, U.S. Ser. No. 272,889, now Patent No. 3,263,382, entitled, "Vertical Cantilever Flagpole," filed April 15, 1963, and relates to a vertical cantilever beam or extensible pole and to the method of erecting same.

The prior art illustrates vertical cantilever poles or beams formed in sections which are generally assembled in the field requiring a relatively large crew, scaffold structures, and in certain cases complicated hoist mechanisms. The construction techniques utilized require a considerable amount of time, labor, tools, and equipment.

The present invention utilizes common steel tubes or tubing telescoped inside of each other plus some prefabrication so that a sectional pole may be fabricated economically in the shop, arranged and sold in a do-it-yourself package, and erected in the field with a minimum of effort, labor, tools, and time to most any practical height. The prefabricated package consists of the pole sections forming the extensible pole and certain of the tools and eqiupment for erecting same. The remaining tools required are available to almost anyone and are of the type readily available in one's work shop.

The present invention is primarily designed to permit a person to display the United States Flag at his home and at small industrial plants. However, it should be understood that the extensible pole has other uses other than for displaying a flag, namely in the field of sending and receiving radio signals, flood and spot lighting, construction, etc.

The present invention is particularly designed so that it may be manufactured by companies presently making steel tubing whereby the scrap tubing resulting from other operations may be utilized to make the extensible pole. Since there are no standard sizes of poles and no need for any particular standardization of sizes, the present invention lends itself to economy in material and prefabrication by using odd-size lengths and diameters of tubing as well as regular production lengths and diameters. The primary requirement for the tubes or tubing utilized is that it be straight and fit inside each other with a minimum amount of clearance therebetween. It will of course be appreciated, that a company having cold drawing facilities can easily meet this requirement by reducing odd-size diameters to diameters that are needed. Drawing the tube to the correct diameter increases the tube length. Therefore, tubes which are previously considered scrap by the manufacturer may be utilized in making the present invention.

The base member or tube of the extensible pole is provided with a tapered end or point so as to facilitate its being driven into the ground and in addition to prevent the earth from entering the tube. Normally, in order to reduce the diameter of a tube by cold drawing, the tube must be pointed to allow the drawing mechanism to pull the tube through the cold draw die. After the tube is reduced by cold drawing, the point or tapered end of the base is usually cut off and scrapped. In the case of the base member of the extensible pole, the cutting off of the tapered end is not required, thereby providing an additional economy in the manufacture of the extensible pole. When the manufacturer employs the method of extrusion for making tubing, the slug from the extrusion is normally considered scrap material. However, with the present invention, the slug is utilized as a weight to drive the base member or tube into the ground as will be subsequently described and thus results in another economical advantage.

In addition, a number of short sections of tubing is utilized in the formation of the package pole so as to form tubular clamping elements or collars and a sight gage or level. Thus tubes which have been rejected at the factory for other uses because of not being straight can be used for the required short sections of the package pole. This reduces the cost of the scrap or the cost of re-straightening the tubing.

It is an object of the present invention to provide a knock-down prefabricated sectional pole package consisting of the tubular pole members and certain of the tools and equipment for erecting the pole in the field.

Another object of the present invention is to provide an extensible pole comprising an elongated tubular base member, a plurality of elongated tubular section members coaxially and telescopically arranged with respect to the base member, said members gradually decreasing in cross section and of gradually increasing length from the base member to the inner one of the section members, said base member supporting the section members during both extension and retraction of the pole.

Still another object of the present invention is to provide an extensible pole of the aforementioned type wherein the lower end of the base member is tapered to facilitate the mounting thereof in the ground.

A further object of the present invention is to provide lift means for the extensible pole wherein the lift means is designed to successively engage each section member and raise it to an elevated position for connection to the immediately following section member when extending the pole and conversely to engage and lower each raised section member in turn when retracting the pole.

A still further object of the present invention is to provide a structure of the aforementioned type wherein the lift means includes a vertically movable elongated erection member having means thereon selectively engageable with the section members of the pole, one by one, and a manually operable jack for vertically moving the erection member to extend or retract the section member in engagement therewith.

Another object of the present invention is to provide a structure of the aforementioned type wherein a sight gage or level is carried by the base member of the pole to facilitate the erection thereof in a vertical plane.

Still another object of the present invention is to provide a novel method of erecting a sectional pole in a step-by-step sequence.

A still further object of the present invention is to provide on the top portion of the extensible pole a revolving truck which is rotatably supported by ball bearings on the upper and lower ends thereof.

Another object of the present invention is to provide a sight gage comprising a tubular collar, a triangular shaped tubular frame sleeved over the collar and secured to the outer periphery of the collar, said frame having three tubular arms arranged to form an endless conduit, three upstanding relatively short tubular elements at the intersection of the arms, and a sufficient quantity of liquid in the sight gage to fill the conduit and portions of the elements.

Still another object of the present invention is to provide an improved O-ring water seal between adjacent tubular sections and corresponding clamp of the extensible pole.

A further object of the present invention is to provide a method of making the pointed closed end on each of the base member and guide tube.

It is thus another object of this invention to provide a simplified low-cost structure of the aforementioned type having certain advantages contributing to efficiency, reliability and long life as well as ease of maintenance.

Further objects and advantages of the present invention will be apparent from the following description, reference being had to the accompanying drawings wherein a preferred form of the present invention is clearly shown.

FIGURE 1 is an elevational view, partly in section, of the erected extensible pole mounted in undisturbed earth.

FIGURE 2 is a fragmentary enlarged view, in section, illustrating a typical connection between a pair of adjacent tubular section members or elements of the extensible pole.

FIGURE 3 is a view similar to FIGURE 2 illustrating the way in which the liquid level or gage is used to provide the connection between the two lowest section members of the pole.

FIGURE 4 is an elevational view, partly in section, illustrating the base member and liquid level of the pole in a position immediately prior to the base member being driven into the ground by the weighted tube.

FIGURE 5 is a view similar to FIGURE 4 but illustrating the position of the base member after the first blow of the weighted tube has been delivered thereto.

FIGURE 6 is a view similar to FIGURE 5, illustrating the position of the base member after many blows have been delivered thereto, and further illustrating the weight on the upper end of the weighted tube.

FIGURE 7 is an elevational view, partly in section, illustrating the manner in which the base member of the extensible pole and the erection tube are encased and supported in concrete.

FIGURE 8 is a plan view of the liquid level or gage looking in the direction of arrows 8—8 of FIGURE 7.

FIGURE 12 is a fragmentary elevational view of the top portion of a cantilever beam or flagpole provided with a rotatable or revolving truck.

FIGURE 13 is a sectional view of the revolving truck taken on the line 13—13 of FIGURE 12.

FIGURE 14 is a plan view of another embodiment of a liquid level or sight gage.

FIGURE 15 is a front elevation of the sight gage illustrated in FIGURE 14.

FIGURE 16 is a fragmentary view partly in section of the pointed end of the base member of the flagpole or of the guide tube.

FIGURE 20 is similar to FIGURE 19 except the bottom portion is clamped.

FIGURE 21 is similar to FIGURE 12 except it shows an alternate method of mounting the revolving truck.

FIGURE 22 is a plan view of another embodiment of a sight gage.

FIGURE 23 is a front elevation of the sight gage shown in FIGURE 22.

Figure 11:
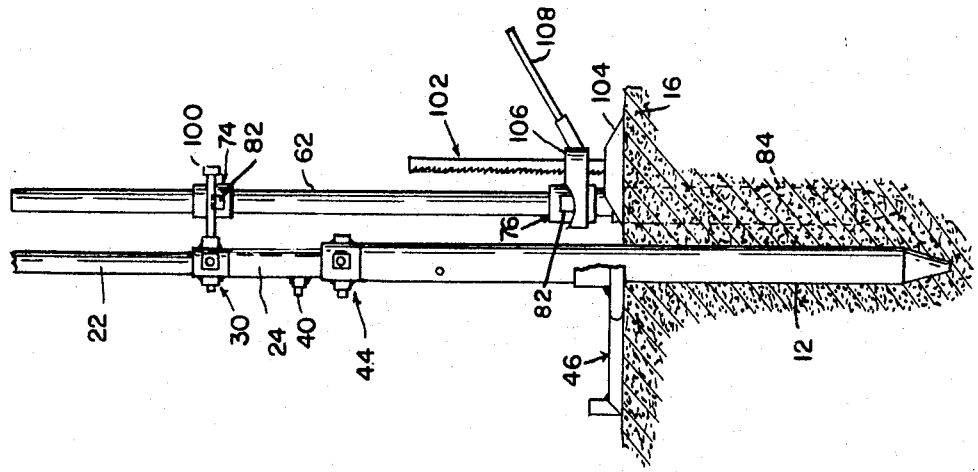
FIGURE 11 is similar to FIGURE 9, illustrating the innermost section element raised one step and the erection member and jack in a position ready to raise the innermost section member another step.

Referring now to the drawings, the erected flagpole is designated by the numeral 10 and comprises a plurality of telescopically arranged tubuilar sections as best illustrated in FIGURE 1. The flagpole 10 is designed as a vertical cantilever beam so as to withstand the concentrated load at the top of the pole and the wind load distributed uniformly over the length of the pole. The various sections of the pole, including the connections therebetween, are usually made from steel tubing. The lengths and diameters of the component parts of the pole 10 are designed in the shop according to accepted practice so as to withstand the anticipated bending stresses.

The flagpole 10 is provided with a base member 12, the lower end of which is pointed as is indicated by the numeral 14 to facilitate the erection of the base member 12 in the ground 16. The pointed end 14 of the base member 12 is closed to prevent dirt from entering the interior thereof. In the shop, a rotary swaging machine could be used to point the base member 12. Telescopically arranged within the base member 10 are a plurality of section members or elements of gradually increasing height and of gradually decreasing diameter from bottom to top as will be explained in more detail later on.

Four such section members are illustrated in FIGURE 1 and are designated from top to bottom by the numerals 18, 20, 22, and 24. The top of the section member 18 is provided with appropriate fastening devices for carrying the flag 26. Appropriate means, including the rope 28, is provided for raising and lowering the flag as is well known in the art. It should be understood that any number of section members may be utilized to attain any practical pole height.

The ends of each of the pairs of adjacent tubular section members are interconnected by a typical connection designated by the letter A in FIGURE 1. Three connections A are required for the pole illustrated in FIGURE 1 and a typical connection is illustrated in FIGURE 2. Connection A includes an upper adjustable clamping device 30 and a lower locking device 31. Clamp 30 comprises a relatively short tubular collar 32 which is telescoped around the upper and inner member 22 of the adjacent members adjacent to the top of the lower one of the adjacent members, four circumferentially spaced nuts 34 which are welded to the outer periphery of the collar 32, and four adjustable threaded locking elements or set screws 36 which are threadedly received in the nuts 34 and are adapted to be moved through corresponding openings provided in the collar 32 so as to engage the opposite wall of the upper and inner tubular section member 22. With such a construction the collar 32 is secured to the upper section member 22 and the bottom surface thereof rests on the top end surface of the lower section member 24 to prevent downward movement of section member 22 with respect to the lower section member 24.

The locking device 31 includes a nut 38 which is welded to the outer periphbery of the tube 24 and carries the threaded locking element or set screw 40. The set screw 40 is aligned with an opening 41 provided in the outer section member 24 so that the set screw may be moved into locking engagement with the inner section member 22.

The section member 24 is located with respect to the base member 12 by an adjustable clamp 44, identical to the clamp 30 illustrated in FIGURE 2, which prevents section member 24 from moving downwardly with respect to the base member 12. A liquid level or gage 46 is provided around the base member 12 to assist in erecting the base member 12 in a vertical plane. After the base member 12 has been driven in the ground and the liquid level 46 has served its primary purpose, the level 46 is moved to a position illustrated in FIGURES 1 and 3 where a pair of set screws 47 provided thereon extend through corresponding openings 48 provided in the base member 12 so as to engage the lower end of the section member 24.

The liquid level or gage 46, as best illustrated in FIGURES 4–7, is made primarily from relatively short pieces of tubes and comprises a tubular collar 49 having welded thereto four radially extending arms 50 spaced 90° apart. The inner ends of the tubular arms 50 are welded to the collar 49. The outer ends of the tubular arms 50 are provided with relatively short, upwardly opening tubes 52 which are welded to the long arms 50. Three tubular struts 54 are provided for interconnecting the interiors of the arms 50 as best illustrated in FIGURE 8. All of the various tubular elements are welded together to form one water-tight unit. The tubular collar 49 is provided with a pair of circumferentially spaced nuts 56 which are welded thereto. The nuts 56 carry the threaded locking elements or set screws 47 which are adapted to engage the outer periphery of the base member 12 when the level is used during the erection of the flagpole 10. The threaded set screws 47 are also adapted to extend through the openings 48 provided near the upper end of the base member 12 to interlock the section member 24 with the base member 24 with the base member 12 as previously described. Thus the liquid level 46 becomes a part of the erected pole 10 to aid in the support of the section members, to lend aesthetic appeal, and to serve as a support for the rope 28 as illustrated in FIGURE 1.

One of the features of the present invention is the manner in which the flagpole 10 is erected in the field. Initially, the base member 12, as best illustrated in FIGURE 4, is mounted in a vertical plane with the lower and pointed end 14 thereof being received within the collar 49 of the liquid level or gage 46. An elongated and removable tubular erection member 62 is provided with a bottom abutment surface 64 which engages a relatively short tubular element 66 housed within the interior of the base member 12 adjacent the closed end 14 thereof as best illustrated in FIGURE 4. The tubular element 66 is of the same diameter as the tubular erection member 62 and is required so that the erection member 62 will have a solid and even surface to strike. If the tubular extension 66 was not utilized, the erection member 62 could possibly become stuck within the pointed end 14 of the base member 12 while the base member 12 is being driven into the ground by the erection member 62.

The upper end of the erection member 62 is provided with a relatively heavy weight 70 which is welded to a relatively short tubular element 72. The element 72 is located in the interior of the erection member 62 as best illustrated in FIGURE 6 and is separable therefrom. An upper clamp 74 and a lower clamp 76 are carried by the upper end of the erection member 62 for purposes to be hereafter explained. The clamps 74 and 76 are of identical construction and each consists of a relatively short tubular collar 78 provided with a nut 80 which is welded to the outer surface thereof. Nut 80 carries a threaded mating bolt 82. A hole 83 is provided in the upper end of the erection member 62 opposite the bolt 82 provided in the lower clamp 76 so that the bolt 82 may be moved to a position to engage and hold the tubular element 72.

The weight 70 may be made from a scrap slug of metal which results from making an extruded tube as mentioned previously. While weight 70 could be welded directly to the erection tube 62, it has been found that by welding it to the relatively short element 72, that the element 72 and the weight 70 can be conveniently utilized as a hammer for purposes not specifically connected with this invention. In addition, erection tube 62 will be utilized in connection with the step-by-step erection of the section members of the pole 10. At such a time it is not desirable to have the weight 70 carried directly by the erection member 62, since the person erecting the flagpole 10 would have to not only lift the erection member 62, but also the weight 70 and element 72.

In order to drive the base member 12 plumb, the level 46, as previously described, is utilized. The level 46 is telescoped over the outside of the base member 12 with a minimum amount of clearance therebetween. When the level 46 is placed on a level surface and the base member or tube 12 is perpendicular to the level surface, the water level in the relatively short tubes 52 will be the same. When using the level 46, water is poured into one of the tubes 52 and enters the other tubes. This procedure is recommended so that when the water flows to the other four tubes 52, air will not become trapped in tubes 50 and 54. Enough water should be poured into the level 46 so that its height from the top of all tubes 52 can be clearly seen when the base member 12 is plumb. At such time, the four liquid surfaces in tubes 52 will be the same distance from the top of the tubes 52.

The erection member 62 provided with the removable weight 70 is manually raised from the position shown in FIGURE 4 to a sufficient height so that the lower end 64 thereof will strike the tubular element 66 and in turn drive the base member 12 into the ground 16 from the position illustrated in FIGURE 4 to the position illustrated in FIGURE 5. This operation is repeated a sufficient number of times until the base member 12 has been driven into the ground 16 to the position illustrated in FIGURE 6.

In order to facilitate the erection and assembly of the section members in the field, the invention further contemplates a novel method for erecting the section members in a step-by-step relationship. Initially, a tubular support 84 having a pointed end 86 is driven into the ground 16 in parallel spaced relationship with the base member 12. The weighted erection member 62, which is removed manually from the base member 12 upon erection thereof, is utilized to drive the tubular support 84 into the ground 16 in the manner described for the base member 12. The tubular support 84 is provided with a tapered and closed end 86 which serves the same purposes as the closed end 14 of the base member 12. The support 84 has the same inside and outside diameters as the base member 12 due to the fact that the liquid level or gage 46 may be used not only in erecting the base member 12 but also the tubular support 84. The interior of the support 84 is provided with a tubular element 66 which is used for the same reason as was explained in connection with the base member 12.

In certain applications it is desirable to utilize concrete at the base of the base member 12 and the tubular support 84. A hole 81 of suitable diameter and depth is dug as illustrated in FIGURE 7. The base member 12 and the tubular support 84 are driven into the ground as previously described to a depth sufficient to hold them in place so that the concrete 85 may be vibrated as required. However, before erecting either of the members 12 and 84 and prior to the insertion of the liquid level 46 over either of them, a tube clamp 87 is inserted over each of the members 12 and 84 as illustrated in FIGURE 7. Each clamp 87 comprises a tubular collar 88 having welded to the outer periphery thereof four equally spaced threaded nuts 90 and four threaded mating set screws 92. Corresponding holes are provided in the collar 88 so that the set screws 92 may be moved inwardly to a position to grip the base member 12 or the tubular support 84, as the case may be. The only purpose of the clamps 87 is to increase the bond of the concrete 85 to the base member 12 and support 84.

In order to keep the concrete 85 from entering the tubular support 84, a closure 94 is placed over the tubular support 84. The closure 94 comprises a relatively short tubular element 96 and a cover 98 which are welded together and utilized as a unit to close the tubular support 84. Tubular element 96 has the same diameter as element 66 and the erection member 62.

At this point it may be seen that it might be more convenient to drive the tubular support 84 into the ground before the base member 12 because the liquid level 46 might be more easily maneuvered therebetween. However, if only three struts 54 are utilized in the liquid level 46, the level 46 can be conveniently maneuvered between the base member 12 and the support 84 even if the base member 12 is driven into the ground before the support 84.

After the tubular clamps 87 have been fixed on their respective tubular members, the liquid level 46 is raised off the ground 16 to permit working room in order to pour the concrete 85. Prior to pouring the concrete 85, it is desirable to check to see that the base member 12 and tubular support 84 are plumb. This procedure should also be followed before the concrete 85 sets.

The present invention also contemplates the novel manner in which the section members are movable relative to the stationary base member 12 to almost any practical height in a step-by-step manner. The steps required will be described in discussing FIGURES 9–11. The procedure for raising the section members of the pole 10 is the same regardless of whether the tubular base member 12 is located in undisturbed earth or surrounded by a concrete base.

Figure 10:
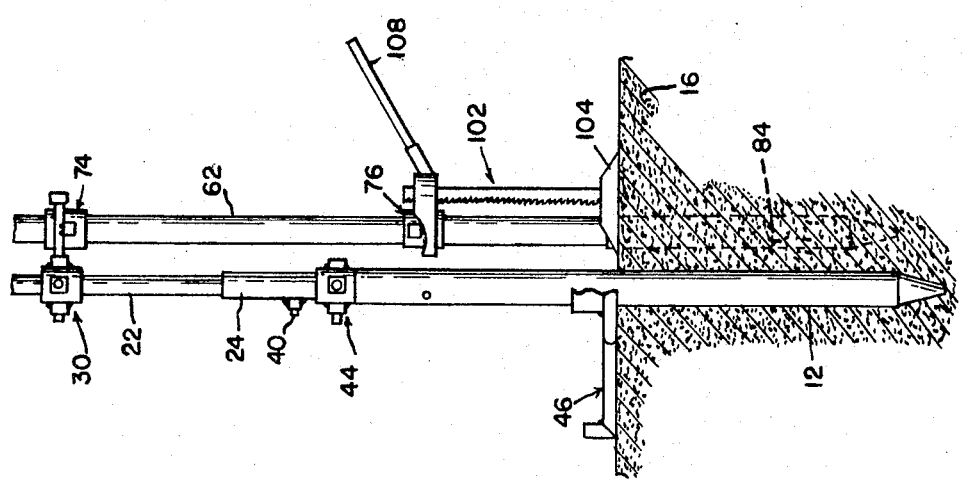
FIGURE 10 is a view similar to FIGURE 9, illustrating the jack and erection member raised one step so as to raise the innermost section member of the pole one step.
Figure 9:
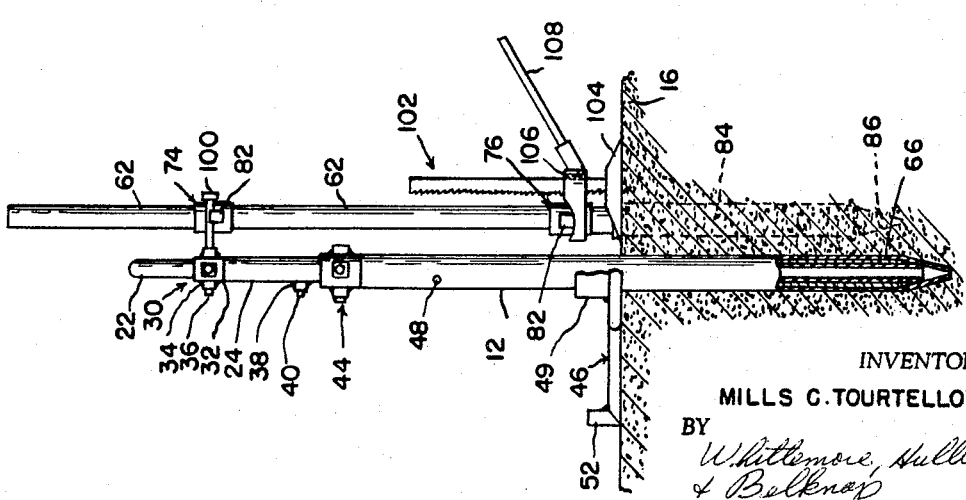
FIGURE 9 is an elevational view, partly in section, of the extensible pole in a retracted position and the erection apparatus therefor, with the pole consisting of only three tubular section members for purposes of clarity.

For purposes of illustration, the extensible flagpole 10 illustrated in FIGURES 9–11 is provided with only two movable section members, namely section members 22 and 24, rather than the four section members illustrated in FIGURE 1. It should be understood, however, that any number of movable section members may be employed and erected in the field according to the method of erection to be subsequently described for section members 22 and 24.

It should be observed when referring to FIGURE 9 that the section members 22 and 24 are coaxially and telescopically arranged with respect to the base member 12. The section members 22 and 24 have extended and retracted positions with respect to the base member 12. FIGURE 9 illustrates the section members 22 and 24 in a retracted position, while FIGURE 11 shows the section members in an extended position. It should be noted that the base member 12 has an overall length which is less than the length of any of the section members. The outermost section member 24 and the tubular element 66 have a combined length greater than the length of the base member 12 but less than the length of the inner section member 22 as is clearly illustrated in FIGURE 9. This relationship is important so as to insure that the upper end portions of all the members will be exposed when the pole 10 is in the retracted position.

After the base member 12 has been erected as described in connection with FIGURES 4–7, the erection member 62 is removed from the base member 12, if it has not already been done so. The weight 70 and the tubular element 72 are removed from the erection member 62, after which time the erection member 62 is vertically mounted in the tubular support 84 as illustrated in FIGURE 9.

The lower tubular clamp 44 is inserted around the outer section member 24 which is in turn inserted into the base member 12. The upper tubular clamp 30 is inserted around the movable inner section member 22 which is in turn inserted into the outer section member 24. One of the four set screws 36 is removed from the upper tubular clamp 30 and an elongated threaded bolt 100 is inserted therein as illustrated in FIGURE 9. The upper tubular clamp 74 provided on erection member is moved upwardly to a position where the threaded locking bolt 82 abuts the bolt 100 provided on the upper tubular clamp 30.

The lower tubular clamp 76 provided on the erection member 62 is located slightly above the ground 16. A conventional automobile jack 102, including a base 104, lift mechanism 106, and an operating handle 108, is brought into engagement with the locking element or bolt 82 provided on the lower tubular clamp 76. Both bolts 82 and bolt 100 are tightened. The jack 102 is operated by manually moving the operating arm 108 as is required in operating a conventional automobile jack. With such a construction, the operation of the automobile jack 102 is effective to move the erection member 62 vertically upwardly, and as a result of the connection between the upper section member's tubular clamp 30, and the upper clamp 74 provided on the erection member 62, the section member 22 is moved or raised one step from the position illustrated in FIGURE 9 to the position illustrated in FIGURE 10.

After the jack 102 has been raised upwardly so as to advance the inner tubular section member 22 one step equal to the height of one jack to the position illustrated in FIGURE 10, the set screw 40 carried by the outer section member 24 is moved inwardly through the opening 41, as best illustrated in FIGURE 2, into engagement with the outer periphery of the inner section member 22 so as to retain the relative positions between the section members 22 and 24.

After the inner section member 22 has been fixed by means of the set screw 40, the jack 102 is reversed and lowered to return the erection member 62 to the position illustrated in FIGURE 11. Later the upper tubular clamp 30 provided on the tubular member 22 is lowered from the position illustrated in FIGURE 10 to the position illustrated in FIGURE 11, after which time the bolt 100 provided on the upper tubular clamp 30 and the bolt 82 provided on the upper tubular clamp 74 are brought into engagement once again. After the set screw 40 has been released, the jack 102 is again operated so as to raise the erection member 62 and advance the inner tubular section member 22 an additional step, after which time the set screw 40 is moved to a locking position to hold the section member 22. This procedure of raising and lowering the jack 102 is repeated until the section member 22 has been advanced the requisite number of steps. To assure that the section member 22 is not jacked out of the section member 24, a white ring or other identifying mark, not shown, is placed on the outer periphery of the lower end of the section member 22. With such an arrangement the operator can visually notice the white ring or other identifying mark after it has been moved upwardly and outwardly beyond the top end surface of the outer section member 24. After the identifying mark has been exposed, the set screw 40 is again moved inwardly so as to bear tightly against the inner section member 22. The identifying mark is located so that sufficient length of tubing will extend into the section member 24 to give it adequate bearing length for a rigid cantilever, and to allow set screw 40 to be near the end of this bearing length. Set screw 40 should be tightened sufficiently so as to cause the inner section member 22 to expand into the outer section member 24 but not too tight so as to permanently deform section member 22. If the section member 22 were permanently deformed, it would be difficult to lower at some future time.

After set screw 40 has been located as just described, the upper clamp 30 is moved downwardly to a position where the lower end surface thereof abuts the top end surface of the outer section member 24 as described previously in connection with FIGURE 2. All four set screws 36 are then urged into tight engagement with the outer periphery of the section member 22.

Later, the upper tubular clamp 74 provided on the erection member 62 is moved downwardly to a position beneath the lower clamp 44 provided on the section member 24, after which time the bolt 100 from the upper clamp 30 is inserted into one of the nuts of the lower clamp 44. The upper clamp 74 is moved into engagement with the locking bolt 100 as was described in connection with the erection or extension of section member 22. The jack 102 is operated in the same manner as previously described so as to raise the erection member 62 and advance the outer section member 24 (and the section members connected thereto) one step. Prior to repeating this operation, the liquid level 46 is moved upwardly to the position indicated in FIGURE 3 where the two set screws 47 are brought into engagement with the two drilled holes 48 and the intermediate portion of the outer section member 24 to locate same with respect to the base member 12. The jack 102 is returned to its original lowered position and the lower tubular clamp 44 is lowered and once again interconnnected with the clamp 74 provided on the erection member 62. The jack 102 is again operated, after unfastening set screw 47, so as to advance the section member 24 one step. This procedure is repeated step by step until a white ring or other identifying mark provided on the section member 24 is exposed, after which time the liquid level or gage 46 is locked into the position illustrated in FIGURE 3 where both locking elements 47 are moved to a position to engage the lower end portion of the section member 24. The lower clamp 44 is then moved to a position where the bottom end surface abuts the top of the base member 12. Finally all four set screws 36 are tightened. Care must be taken after each lift not to loosen set screws 47 too much, else the level 46 will drop to the ground.

After the jack 102 and the erection tube or member 62 have been removed from adjacent the pole 10, the closure 94 is inserted into the tubular support 84. It should be remembered that additional section members and corresponding clamps may be utilized with the structure described in FIGURES 9–11 so as to obtain any practical height. The additional section members are raised in the same manner as just described. As previously mentioned, the relationship of the lengths of the members 12, 24, 22 and 62 is important. In the case of the members forming the portions of the extensible pole 10, the length must protrude one above each other as illustrated in FIGURE 9 so that there is sufficient room for the clamps 30 and 44 to provide adequate bearing length for each tube. In addition, the weighted erection member 11, sometimes called the pole driver, must have a length sufficient to reach the innermost tube 22 when the pole is in a retracted position and in addition to maintain a portion thereof in the support tube 84 when it is raised to the capacity of the jack 102.

The set screws should be of the internal hex head type. This type of set screw can be securely tightened and it will also make it convenient to clamp the base supporting clamps 87 before the concrete 85 is poured. If all the set screws are of the same size, only one size wrench will be required. It should also be noticed that the present erection method makes it convenient to paint each section of the pole as it is raised into place. The lift mechanism 102 and erection member 62 may also be utilized in lowering the flag pole to the retracted position. Thus, with the aid of gravity, the extensible pole 10 can be conveniently lowered in much the same way that it was raised. It may be necessary to lower the pole in order to paint it, to replace parts at the top of the pole, or for other maintenance purposes. Thus the feature of conveniently dismantling and subsequent re-erection becomes an important feature of this invention.

As mentioned previously, the component parts of the flagpole 10, as illustrated in FIGURES 9–11, would be available in a package which would contain the paint and all the tools necessary for the erection thereof, with the exception of the wrench for the bolts, the jack 102, a step ladder, and water for the level or gage 46. The step ladder is essential in order to adjust the clamps, etc. As previously described, if the pole 10 is to be used to display a flag, at least the hardware on top of the pole would be supplied. The flag may also be considered as part of the package. If concrete were used, the erector would furnish the necessary digging tools and the concrete.

FIGURES 12 and 13 illustrate a revolving truck 120 which is provided on the top of a flagpole, as an example, of the type illustrated in FIGURE 1. The top tubular section member 122 of the flagpole is provided with a collar 124 which is welded thereto as indicated by the numeral 126. The collar 124 is located, as an example, approximately four to five inches below the upper end surface 128 of the section member 122. Sleeved over the upper portion 129 of the section member 122 located above the collar 124 is a tubular sleeve or element 130. The sleeve 130 includes an internal bore 132 which has sufficient clearance with respect to the upper portion 129 of the section member 122 as best illustrated in FIGURE 13. The inside corner at the upper and lower ends of the sleeve 130 are relieved, as an example, at 45° as indicated by the numerals 134 and 136 respectively. With such a construction the relieved surfaces 134 and 136 define ball seats as will subsequently appear.

The tubular section member 122 is provided with an inner wall or surface 140. Located inside the member 122 and below the upper surface 128 thereof is an internally threaded nut 142. The nut 142 is welded to the inner wall or surface 140 as indicated by the numeral 144 in FIGURE 13. The weld 144 should be specified as being watertight.

A head device or structure 146 is provided on top of the section member 122 which is adapted to be threadedly connected to the nut 142. The head device or structure 146 includes a float 147 made from plastic or other suitable material. The bottom of the float 147 is provided with an internally threaded bore 152. Located within the bore is a threaded rod 154 which extends outwardly therefrom away from the surface 150. Washer 156 is sleeved over the rod 154 and together with rod 154 and float 147 form the head device 146.

An upper ball race is defined by three separate surfaces including the lower surface 160 of the washer 156, the relieved surface or ball seat 134 and the outer surface of the upper portion 129 of the section member 122. Located within the upper ball race is a series of ball bearings 162, as an example, thirty-three in number.

A lower ball race is defined by three separate surfaces including the top surface 164 on the collar 124, the relieved surface or ball seat 136 and the outer surface of the upper portion 129 of the section member 122. Located within the lower ball race is a plurality of ball bearings 166, as an example, thirty-three in number.

By cutting the inside corner at the upper and lower ends of the tubular sleeve 130 at a 45 degree angle, the upper and lower series of ball bearings 162 and 166 are interposed and located in such a manner that the ball bearings act as a thrust bearing as well as a radial bearing. The bearing structure just described is inexpensive and compact. The bearing structure can be taken apart easily by unscrewing the head device 146 at the top of tubular section member 122. The head device 146 holds the bearing structure under sufficient load.

In order to obtain a smooth running fit between the rotating parts, float 147 is screwed down sufficiently so that the bottom surface 160 of washer 156 and the top surface 128 of 122 are tight. Then collar 124 is positioned so that the truck 120 rotates smoothly. At this point weld 126 is applied.

To keep the threaded stud 154 from becoming accidentally unscrewed and to seal from water on the inside of the pole, a sealer is generally applied to the threads of 154.

Secured to the outer surface of the sleeve 130 is an internally threaded nut 168 which carries a threaded bolt 170. A pulley 172 is mounted on the bolt 170 as shown in FIGURE 12. The pulley 172 and halyard or rope 174 are used for hoisting a flag.

In order to secure the bolt 170 into nut 168, a center punch mark 150, to distort the thread, is placed on the thread of the bolt 170. If the center punch mark 150 is between pulley 172 and nut 168, the bolt may be conveniently unscrewed. If the center punch mark were placed on the end of the bolt, the distorted thread would need to pass completely through nut 168. This may in turn damage the threads on the bolt 170 and nut 168.

FIGURES 14–15 illustrate a modified form of a water level or sight gage 176 which is used in the same manner as the sight gage illustrated in FIGURE 8. The sight gage 176 includes a triangular shaped watertight frame 178 which takes the form of an equilateral triangle. The frame 178 is provided with three arms 180, 182 and 184, of equal length. Each arm engages one end of the other two arms as best illustrated in FIGURE 14. The tubular arms 180, 182 and 184 are interconnected so as to provide an endless watertight conduit. The frame 178 is provided with openings at the three intersections of the arms 180, 182 and 184 so as to permit three upstanding elements 186 to be fixedly connected to the frame at the intersections. The three elements 186 are in fluid communication with the endless conduit defined by the frame 178. The frame 178 is sleeved over a tubular collar 188, with the frame 178 being appropriately connected to the collar 188 at three circumferentially spaced points. As an example, the frame 178 is secured to the collar 188 by welding as indicated by the numeral 190. The collar 188 is provided with an opening around which is mounted a nut 192. The nut 192 carries a bolt or threaded element, not shown, for mounting the sight gage 176 on a pole as described previously.

When using the gage 176, water is poured into one of the tubes or elements 186 and enters the arms 180, 182 and 184 and the remaining two elements 186. This procedure is recommended so that air will not be trapped in the gage 176. Enough water should be poured into the level so that the height of the water from the top of the elements 186 can be clearly seen when the base member is plumb as described in connection with FIGURES 7 and 8. At such time, the three liquid surfaces in elements 186 will be the same distance from the top of the elements 186.

This type of three arm level or sight gage has been proven to be sufficiently accurate when utilized in connection with a twenty-eight foot pilot model pole. After the base member has been erected the sight gage may be removed or it can remain and provide a means for fastening the halyard.

The important feature in the manufacture of the level is to see that the plane establshed by the top surfaces 158 is at right angle to the axis of tube 188. If it is desired to erect a pole other than plumb, the plane established by the top services 158 can be set at some other angle other than 90°. In this manner the liquid level can be used to erect a pole at most any predetermined angle.

The present invention further includes a novel method of making a pointed end on the base member or on the guide tube as shown in FIGURE 16. The point must withstand the internal force of driving the base member and the guide tube from the inside of the point. The usual method of making a strong watertight point on a round tube is to cut three or four circular wedges from the end of the tube. The remaining protruding wedges are then bent into a point and the edges are welded together. This method requires considerable time and effort including the steps of laying out the wedges, cutting, bending, welding and grinding the welds. The labor required is considerable. By using a power shear, the point on the tube is fabricated more rapidly and the quality of the point is superior than heretofore achieved.

The steps required in the method of the present invention in order to fabricate the sheared point 194 on the tube 196 are as follows. Initially two shear cuts are made on the end of the tube 196 which removes two wedges or sections from the end of the tube 196. The tube walls are automatically bent in place ready for welding. The adjacent sheared edges are then welded. The welding needed is approximately half that required by the conventional method. At this stage the upper end of the sheared point is larger than the outside diameter of the tube 196. In many applications, the point could be used as it is. However, to obtain a point that would fit tighter into the ground, the point should not protrude beyond the diameter of tube 196.

In order to shape the point on the tube 196 so that it is not wider than the outside diameter of the tube, the point is first heated in a forging furnace. A hardened mandrel, not shown, which is machined in the form of a point is inserted inside the pointed tube. The point is then forged over the mandrel after which time the mandrel is removed from the tube 196 before the point 194 cools. It is not necessary to grind the pointed end 194 since the forging operation has smoothed out the welded edges. It should be appreciated that in certain cases a mandrel is not required.

From the foregoing it appears that it is necessary to shear the end of the tube in two places at opposite sides of the tube, then weld the sheared edges and finally forge the pointed end so as to smooth out the welded edges. The resulting tube will fit firmly in the ground.

Many flagpoles presently on the market are made in sections as is the case with the flagpole of the present invention. However, many of the conventional flagpoles are not sealed at the joint of each section in order to prevent water from filling the interior of the pole. Water in the interior of the pole may cause excessive corrosion. In addition, water in the interior of the pole is also undesirable from the standpoint of freezing. If the water should freeze it could result in the pole splitting open.

FIGURES 17 through 20 illustrate a unique way of sealing and securing a pair of adjacent tubular section members with an O-ring and clamping member in order to allow convenient lowering and raising of the pole as described previously and in addition to provide an effective water seal.

Figure 17:
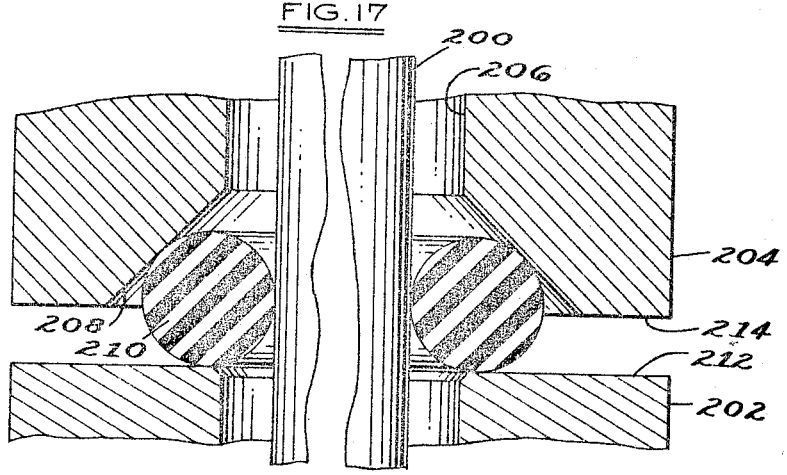
FIGURE 17 is a fragmentary sectional view of a pair of telescopically arranged members, O-ring seal and clamp arranged in an unclamped position.

When the pole is in the retracted position, FIGURE 17, the fixed portion of the pole 202 and the clamp 204 are shown in a normal position, both unclamped. The seal between the O-ring 210 and the fixed portion of the pole 202 is ineffective.

Figure 18:
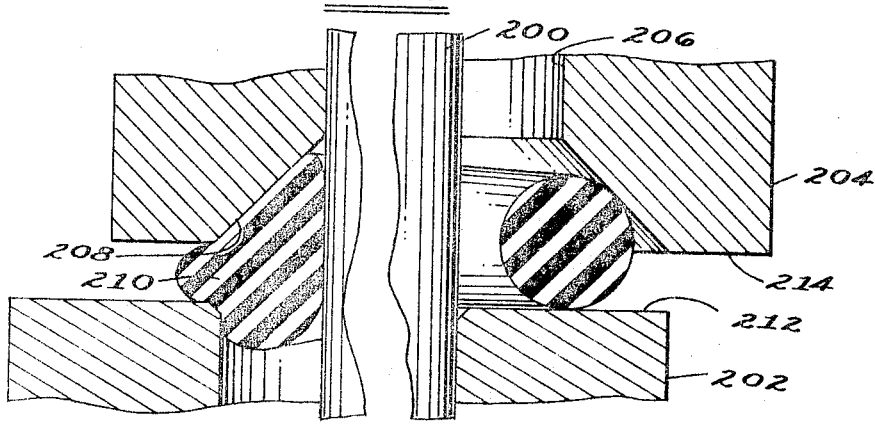
FIGURE 18 is a fragmentary sectional view of a pair of telescopically arranged members, O-ring seal and clamp arranged in a clamped position.
Figure 19:
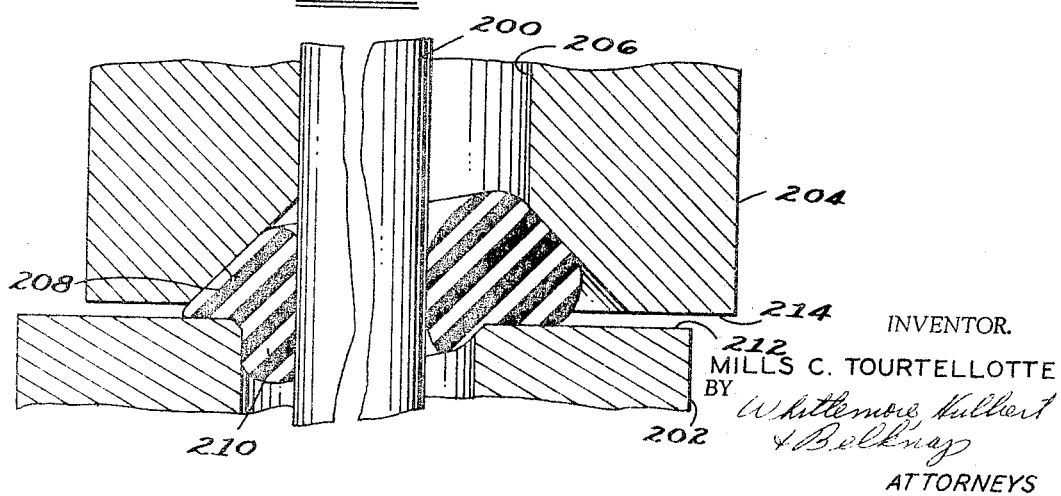
FIGURE 19 is similar to FIGURE 18 except the bottom portion is unclamped to allow gravity to pull the top portion down.

When the pole is extended, FIGURE 18, both the fixed portion 202 and the clamp 204 are clamped. They are purposely clamped so that the fixed portion will take up the slack in one direction and the clamp will take up the slack in the opposite direction. In this manner the O-ring 210 is forced by the clamp 204 into the largest opening between 204 and 200, the portion which should be most difficult to seal.

To force the O-ring 210 to seal where 202 is in contact with 200, the fixed part 202 is unclamped so that the weight of 200 and any components that may be attached to it, may further compress O-ring 210. The result of this squeeze is seen by comparing the gap between surfaces 214 and 212, FIGURES 18 and 19.

To complete the seal and the erection of that particular section of the pole, 202 is reclamped, as seen in FIGURE 20. It is necessary that the O-ring should have certain characteristics including good weather resistance and able to withstand oxidation, sunlight, oil, grease, etc.

FIGURE 21 shows an alternate method of containing the revolving truck 120. In FIGURE 12, the revolving truck must be contained at the top of the pole. Not so in FIGURE 12a. Instead of welding one collar 124 to tube 122, two collars 124a are provided. Each collar 124a has a nut 220 and set screw 221 mounted thereon, so that they may be positioned freely on any exposed surface of 122. To aid in centering collar 124a over the bearings 162, shim 222 is slipped between 124a and 122.

The top of section 122 has a pipe thread 224 cut in it to facilitate mounting a threaded pipe cap 223 or a pipe coupling. The cap may be tapped for threaded rod 154. In turn, ball 147 may be mounted thereon.

By the use of pipe thread 224, the top of section 122 can be used to accommodate a TV antenna, bird house or the like, by simply removing cap 223 and screwing on a common pipe coupling. The antenna mounting, bird house mounting or other similar mounting could then be screwed into the other end of the coupling. By using the common tapered pipe thread 224, the interior of the pole may be kept free of moisture.

The package pole is particularly adapted for rotating a TV antenna. This rotation is desirable to obtain a strong signal from a specific TV channel. The rotation is accomplished by loosening set screw 47, FIGURE 3. By applying a torque to section 24, every part of the pole above section 12 will rotate. This in turn would cause the antenna at the top of the pole to turn. When the desired signal is obtained, set screw 47 is again reset to lock section 24.

In order to maintain the sensitivity of the four arm level, FIGURE 8, and keep the simplicity of the triangular construction, FIGURE 14, an alternate construction of the liquid level is shown in FIGURES 22 and 23. The alternate embodiment allows the lengthening of the arms 180a, and still permits a simple three arm level similar to the one shown in FIGURES 14 and 15.

Besides the differences and features previously described, there are a number of other outstanding differences between, as an example, a thirty foot pole constructed according to the present invention and thirty foot poles available on the market.

The poles available on the market are generally purchased for a fixed height, as an example, thirty feet. The thirty foot pole of the present invention can be erected at any height say between 7'6" minimum to thirty foot maximum height. Suppose the package of the present invention was erected at thirty feet. If for some reason it was determined that thirty feet was too high, the package pole could be easily lowered to some lower level. The poles presently on the market are not easily adapted to such an adjustment.

The poles now on the market cannot be conveniently taken down. Many of the present pole manufacturers design their poles for the most extreme circumstances and weather conditions, which rarely occur. This in turn causes a rather uneconomical design since larger size tubular section members are used than are actually required. The package flagpole of the present invention is economically and safely designed, and may be easily taken down during hurricane weather.

The long weighed erection tube which is supplied to aid in the erection and also in the erection and dismantling of a package pole can also be used as an auxiliary pole. If an additional guide tube and several other parts are furnished with the package flagpole, an auxiliary pole could be erected and used for a number of purposes, such as, stretching a net for tennis or badminton between the auxiliary pole and package pole. With the aid of the erection clamps, clothes could be hung to dry from a rope tied between the auxiliary pole and package pole of the present invention.

Another rather obvious advantage of being able to easily lower a flagpole is that maintenance can be performed on the top of the pole from the ground after the pole is lowered. Repairs are required when the halyard, pulley or truck break or jam. However, many flagpoles now on the market cannot be conveniently lowered. Therefore, a person must climb the pole or special hoisting equipment is required to raise a person to the top of the pole. The fact that a person may need to climb a pole is another reason why present manufacturers over design their poles beyond that required for wind and flag loads.

Most poles now on the market that can be lowered are pivoted at their lower ends. This allows the pole to be tipped from its horizontal position to a vertical position when the pole is being erected, and tipped from its vertical position to a horizontal position when it is being lowered. If the pivoted pole is thirty feet long, a horizontal space of thirty feet is required to erect and lower the pole. Approximately a four foot radius is all that is required to raise or lower the package pole of the present invention regardless of its height.

The drawings and the foregoing specifications constitute a description of the improved method of erecting a sectional pole in such full, clear, concise and exact terms as to enable any person skilled in the art to practice the invention, the scope of which is indicated by the appended claims.

What I claim as my invention is:

1. The combination with an elongated and generally vertical pole of a sight gage for checking the plumbness of the pole, said gage comprising a tubular collar having means to mount the same on the pole coaxially of the latter, a plurality of elongated tubular arms fixedly connected to said collar outside of the periphery of the latter and in a plane normal to the axis of the collar, said arms being provided with relatively short tubular upright elements arranged substantially perpendicular thereto and parallel to the collar axis, said elements being open at the upper ends thereof and in liquid communication at the bottom thereof with said arms, said arms being in liquid communication with one another, and a liquid in said sight gage which is introduced therein and into said arms through one of said elements, said gage having a sufficient quantity of said liquid therein to fill said arms and portions of said elements.

2. The combination with an elongated and generally vertical pole of a sight gage for checking the plumbness of the pole, said gage comprising a centrally located tubular collar having means to mount the same on the vertical pole, with the collar having an axis coincidental with the axis of the pole, four elongated and generally straight tubular arms having the inner ends thereof secured to and closed by the outer periphery of said collar, said arms being equally spaced and extending in a horizontal and radial direction from said collar, the outer ends of said arms being provided with relatively short tubular elements arranged substantially perpendicular thereto and parallel to the axis of said collar, said elements being opened at the outer ends thereof, conduit means interconnecting the inner end portions of said arms, and a liquid in said sight gage which is introduced therein through one of said elements, into the corresponding arm, from where the liquid travels into the remaining arms through said conduit means, said gage having a sufficient quantity of said liquid therein to fill said arms, said conduit means and portions of said elements.

3. The combination with a generally vertically extending pole of a sight gage for measuring the plumbness of said pole, said gage comprising a centrally located tubular collar which is adapted to be mounted on the pole, with the collar having an axis which is coincidental with the axis of the pole, a generally triangular shaped frame sleeved over said collar and secured to the outer surface of said collar, said frame having three generally straight and horizontally extending tubular arms located in the same plane, with each arm intersecting the other two arms, the interior of said arms defining a conduit, three upstanding tubular elements secured to said arms and communicating with said conduit, said tubular elements being opened on the upper ends thereof, and a liquid in said sight gage which is introduced therein through the upper end of one of said tubular elements, into the corresponding arm from where the liquid travels into the remaining arms through said conduit, said gage having a sufficient quantity of liquid therein which fills said conduit and portions of said tubular elements, the intersections of said arms being spaced from said collar.

4. The combination defined in claim 3 wherein each end of each arm of said gage intersects an end on one of the other two arms, said upstanding tubular elements being located at the intersections of said arms.

5. The combination defined in claim 3 wherein each arm of said gage has one end which intersects and is secured to an intermediate portion of one of the other two arms, said upstanding tubular elements being located at the other ends of said arms.

6. The combination defined in claim 3 wherein each of said tubular elements of said gage is elongated and has its axis arranged substantially parallel to the axis of said collar.

7. The combination defined in claim 6 wherein each of said tubular elements of said gage are of equal length, with said frame connected to the bottom end portion of said collar at three circumferentially spaced points.

References Cited by the Examiner

UNITED STATES PATENTS

| | | | |
|---|---|---|---|
| 312,266 | 2/1885 | Gurley | 33—207 |
| 718,330 | 1/1903 | Edwards | 33—73 |
| 1,012,993 | 12/1911 | Dissett | 33—209 |
| 1,409,537 | 3/1922 | Franzen | 33—206 |
| 1,476,430 | 12/1923 | Treloar | 33—74 |
| 1,958,314 | 5/1934 | Reid | 33—209 |
| 2,757,458 | 8/1956 | Zipser | 33—207 |
| 2,761,217 | 9/1956 | King | 33—207 |
| 2,834,118 | 5/1958 | Jackson | 33—215.2 |

LEONARD FORMAN, *Primary Examiner.*

L. V. ANDERSON, *Assistant Examiner.*